United States Patent [19]

Froessl

[11] 4,273,440
[45] Jun. 16, 1981

[54] METHOD AND APPARATUS FOR DATA COLLECTION AND PREPARATION

[76] Inventor: Horst Froessl, Gutenbergstrasse 2-4, Hemsbach, Fed. Rep. of Germany

[21] Appl. No.: 84,174

[22] Filed: Oct. 12, 1979

Related U.S. Application Data

[63] Continuation-in-part of Ser. No. 829,249, Aug. 30, 1977, abandoned.

[51] Int. Cl.³ .................................. G03B 27/52
[52] U.S. Cl. ............................. 355/40; 358/280; 364/900
[58] Field of Search .................. 355/40–43, 355/77, 46; 358/280, 302; 360/33, 72.1; 364/900

[56] References Cited

U.S. PATENT DOCUMENTS

| | | | |
|---|---|---|---|
| 2,968,793 | 1/1961 | Bellamy | 340/172.5 |
| 3,337,766 | 8/1967 | Malaby | 315/18 |
| 3,458,688 | 7/1969 | Garry et al. | 235/61.7 |
| 3,459,888 | 8/1969 | Sokolov | 355/46 X |
| 3,514,537 | 5/1970 | Uemura | 360/72.1 |
| 3,523,183 | 8/1970 | Silverman | 235/61.11 |
| 3,537,788 | 11/1970 | Young | 355/40 |
| 3,712,956 | 1/1973 | Lemelson | 360/33 |
| 3,872,433 | 3/1975 | Holmes et al. | 340/146.3 AH |
| 3,974,493 | 8/1976 | DeCauaignac et al. | 340/324 AD |
| 3,974,496 | 8/1976 | Aptroot-Soloway | 340/337 |
| 4,009,332 | 2/1977 | Van Hook | 358/280 |
| 4,041,463 | 8/1977 | Slutzky et al. | 364/900 |

Primary Examiner—Richard A. Wintercorn
Attorney, Agent, or Firm—Roylance, Abrams, Berdo & Farley

[57] ABSTRACT

A method of recording images of selected areas of source documents by photographic, video or similar camera analog recording techniques. Embodiments of apparatus to perform the method include devices for feeding the source record, aiming the camera and arranging the recorded segments in an order independent of the original order of the data segments on the source record. Also disclosed are systems usable in conjunction with the above for encoding the data in digital form and storage thereof.

17 Claims, 17 Drawing Figures

METHOD AND APPARATUS FOR DATA COLLECTION AND PREPARATION

This is a continuation-in-part of copending U.S. Patent Application Ser. No. 829,249, filed Aug. 30, 1977, and now abandoned.

This invention relates to the selective precollection, display, manipulation and/or keying of data which is on a source data record for various kinds of applications as well as electronic data processing (EDP) so that the data are arranged in segments in a predetermined sequence independent of the sequence in which they are arranged on the source data record and without machine readable markings on the data record. It also relates to apparatus for accomplishing the method and relates to the display of precollected data to general type users and to key operators.

BACKGROUND OF THE INVENTION

It is known to provide documents of the type referred to herein as "source documents" to keypunch operators so that the data can be converted into digital form in a magnetic or other record. In such processes, the source document in its entirety is normally supplied to a keypunch operator, key operator or key processing operator, the terminology used being a function of the equipment involved. Alternatively, the source document can be directly supplied to optical character reading equipment (OCR) wherein all or part of the document is "read" by a machine, converted to a digital code, and stored. In either case, the data in its original format is analog and is converted into digital form by a keypunch operator, is stored in digital form and is retrievable only through a double-conversion process, the first conversion being that of the keypunch operator or machine into the digital code form for storage and the second conversion being that from digital into human readable form.

While these systems certainly have utility in many applications, there are disadvantages to data collection in this fashion and, in any event, it is necessary to retain the source documents for subsequent verification and use for other purposes.

In addition, when a source document is supplied to key-punch operators, there is no possibility for information security because the keypunch operator necessarily must have access to the totality of information contained in the source document so that he or she can select that information which is to be recorded.

While the security problem is not so severe with OCR equipment, the equipment itself is highly expensive, is usable only with source documents of a limited nature and in an especially prepared format and, in many cases, only if the original "writing" which may be printing, is in a predetermined form.

BRIEF SUMMARY OF THE INVENTION

Accordingly, it is an object of the present invention to provide a method of selectively collecting data, by machine and under automatic control, in accordance with predetermined criteria, and in an analog form.

A further object is to provide apparatus for handling source documents or records and for optically collecting and arranging segments of data from those documents or records, the arrangement being independent of the format of the source document.

Yet another object is to provide apparatus for selectively storing segments of data from human readable source documents in a form such that the segments can be retrieved and displayed in the same human readable form in which they appeared on the source document.

Briefly described, the invention includes a method of collecting and organizing selected segments of data from a plurality of source records comprising the steps of providing a plurality of source records each having a plurality of human-readable, analog data segments thereon in a known format, identifying selected ones of the human-readable data segments which are to be collected, defining a sequence in which the identified segments are to be collected and arranged, which sequence is different from and independent of the format in which they appear on the source record, providing at least one recording apparatus capable of recording an optical representation of a visible image placed within its field of view, successively positioning each source document and the apparatus relative to each other such that portions thereof are within the field of view, and successively recording optical representations of the identified data segments in analog form in the defined sequence on a record from which analog representations of the identified segments can be reproduced.

In order that the manner in which the foregoing and other objects are attained in accordance with the invention can be understood in detail, particularly advantageous embodiments thereof will be described with reference to the accompanying drawings, which form a part of this specification, and wherein:

DEFINITIONS

The term "first phase data collection" as used in the following description means the precollecting and storing of data records or segments of data in a previously defined sequence on, for example, magnetic videotape in an analog form, i.e., from analog to analog.

The term "analog" is used in connection with recording or storing of data segments to mean that an image is recorded or presented in a form which is analogous to the original so that an image representative of the original can be produced therefrom. Thus, it is distinctly different from digital recording in which the image is converted, by any technique, to a digital representation of symbols having a similar meaning but a different optical representation.

The term "human readable" is used to distinguish written or printed data in a form intended for interpretation by a person from groups of markings intended primarily for machine command or interpretation purposes.

The term "second phase data collection" as used herein refers to the display to general type users as well as key processing operators, i.e., users of data records or segments of data records precollected during the first phase data collection and includes simple analog display of the recorded data segments or display thereof for purposes of entering data, as by a keypunch operation, for conversion of the data from analog to digital form.

The term "key processing operator" is equivalent to the terms "key operator" and "keypunch operator", as used herein.

The term "data record" as used herein is intended to mean a character data record which is a source data record or document on which alphabetical and numerical data, i.e., information, is contained in handwritten, machine written, written or printed form, such as letters, bills, delivery notes, material issues, orders, drawings or the like.

The term "intermediate file" is used to refer to a storage medium for selected character data records, parts of character data records, or data segments contained on character data records. The storage medium may be video tape or video disk, microfilm or microfiche, or magnetic tape or disk, or copy sensitive paper.

DATA COLLECTION

In the collection and preparation of data, it will be apparent that there is quite often a need for selected access to information on character data records by general type users, i.e., users other than individuals assigned the specific task of converting the data into some other form.

In the conventional EDP approach, it is common to begin with the organizational design of the source records and the printing of those records, so that the information is, from the outset, in a known, predetermined arrangement and sequence. This is accomplished either by arranging the initial data entry forms in such a way that the data is already in an ultimately desired sequence, or else the preparation of the data by manual transfer from data entry sheets onto special sheets during which the data is arranged in a desired sequence so that it can then be entered in that sequence into an EDP system, as by keypunch. The alternative to the prearrangement of this data is the tedious and time-consuming process of using key processing instructions wherein the keypunch operator employs a set of instructions to extract the data from entry sheets which are not in the predetermined sequence.

Whichever of these techniques is used, the next step is the manual key processing or keypunching of the data contained within the record.

The key-processed data is then verified and, if required, reprocessed after correction.

In all of these steps, the paper records are handled by the key processing operators and there are various transportation and waiting periods involved, as well as storage space required, because of the relatively large volume of paper which must be handled at each of these steps and stored before, during and after the processing.

When using the conventional types of mass data collection equipment (keypunch, digital magnetic tape, etc.) the key processing of the data and the verification takes place in sequence, either in one or two work steps, and, while doing this, a manual time-consuming handling of paper records cannot be avoided. For dialogue key-input manual recording, handling is also required. This is true for any type of keying application whatsoever which requires input of data coming from a data record of a written or printed variety.

It necessarily follows that conventional key processing equipment of today results in a bottleneck in the data collection and processing process, in non-EDP or EDP applications. The above conventional method of records handling as well as key-processing of information and, if desired or required, of succeeding verification in one work step or two consecutive or separated work steps results in unnecessary delays, errors and costly operations. In addition, masses of paper are being moved, transported to and from the data processing center, and temporarily filed, in each case taking immense storage space.

Faulty data collection and preparation exists particularly when the verification is performed by the same person who initially key-processed the data. This type of error is usually detected after the computer run and can therefore result in costly errors.

In addition, this data must be reprocessed for correction. The danger of erroneous data collection and preparation causes the data processing personnel to be exposed to a relatively high stress situation.

Similar difficulties as those described above arise in the case of typesetting and magnetic tape typewriting.

Thus, a primary purpose of the invention is to provide a method for the collection and processing of data in general (microfilm, video-recording and the like) and specifically for the preparation of data preceding key processing by which preparation time and errors are reduced considerably, and record handling and the following of instructions by key processing personnel is eliminated, drastically reducing the masses of paper which must be moved, transported and filed.

At the same time, data collection and preparation become largely independent of the record itself and of time and place. The method of the invention permits the elimination of record (form) design in a format specifically for key processing since allocation of space for a specific data element can be added, out of sequence, i.e., at any location remaining within the data record, and at any time after the printing and issue of a blank record. At the same time, it considerably reduces the processing duplication and storage of records as well as today's flood of paper.

Information security can, at the same time, also be considerably improved during transport, filing, display and collection. Additionally, and of considerable importance, the invention provides the basis for a one-data record file only (and no paper copies) in the operation of any facility.

Thus, one begins with a human-readable data record or source document which has various items of data disposed in various locations on the record. This can be envisioned by considering a page divided into rectangular regions, each of which is capable of receiving an item which may be of subsequent interest. It is neither necessary nor particularly desirable that the design of this form facilitate the entry of the data items in any sequence based on logic or on the ultimate use. In other words, one need not know how the various data segments to be entered on that page will be arranged or organized in a future data processing operation. It is only necessary that, in each data record of a specific type, the segments be the same, i.e., that they each contain data of a certain type. Thus, if a name is to be entered, it does not matter where the name appears on the sheet; it could be the first item, the last, or somewhere in between. It is only necessary that on a specific kind of record, a large number of which are to be produced, the name always appears at the same location. As will be recognized, the present invention is suited for systems in which a relatively large number of records having a substantially identical format are to be processed.

In accordance with the invention, the data segments are precollected automatically and optically by one or more recording devices, sequentially or in parallel, in a first phase. In a subsequent operation, the data segments can be displayed to a key processing operator or other user in the second phase. In making use of the first phase, several possible reader devices can be used, as will be described.

Figure 1:
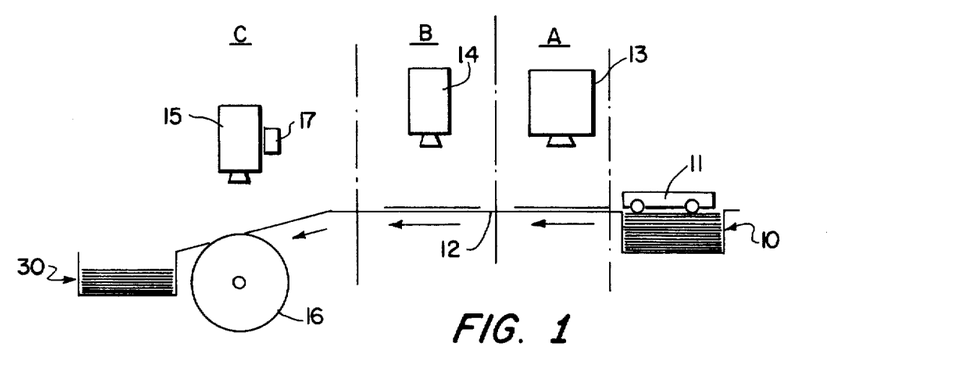
FIG. 1 is a schematic side elevation of one embodiment of an apparatus in accordance with the invention and for performing the method thereof.

Referring now to the drawings in detail, it will be seen that FIG. 1 is a schematic side elevation of a system incorporating the principles, and performing the method, of the present invention. A plurality of data records are provided in a stack 10 in conjunction with a document feeder 11 for the purpose of delivering individual records, successively, to a conveying device 12 for conveying the documents individually in the direction indicated by the arrows. The documents are delivered to a first station A at which the entire document can be microfilmed for later reference. A conventional microfilming camera 13 (such as AGFA A5000 hopper and D5000 Automatic Microfilming Equipment, Agfa-Gevaert AG, Munich, West Germany) is schematically illustrated for this purpose, the field of view thereof being directed downwardly toward the document. This station should be regarded as an optional step which is advantageous because it permits destruction of the original document at a later time, as will be described.

The document then arrives at a station B which includes a video camera 14 for video recording the entire data record. This station is also an optional station and can be provided as an alternative to station A or in addition thereto if transportation of records of complete documents are to be transmitted to a remote location, either by transportation of the videotape itself or by electronic means.

Of considerably greater significance in the present invention is station C which includes camera means 15 for selectively precollecting data segments in a defined sequence in accordance with the invention. Station C includes a document handling drum 16 with means thereon for engaging and handling the record. Drum 16 can be driven by a step motor so that line-by-line segments thereof can be exposed to the field of view of the video camera 15. It will be observed that the video camera is supported on a support rail 17 so that it is movable in a direction parallel with the axis of rotation of drum or cylinder 16.

Figure 2:
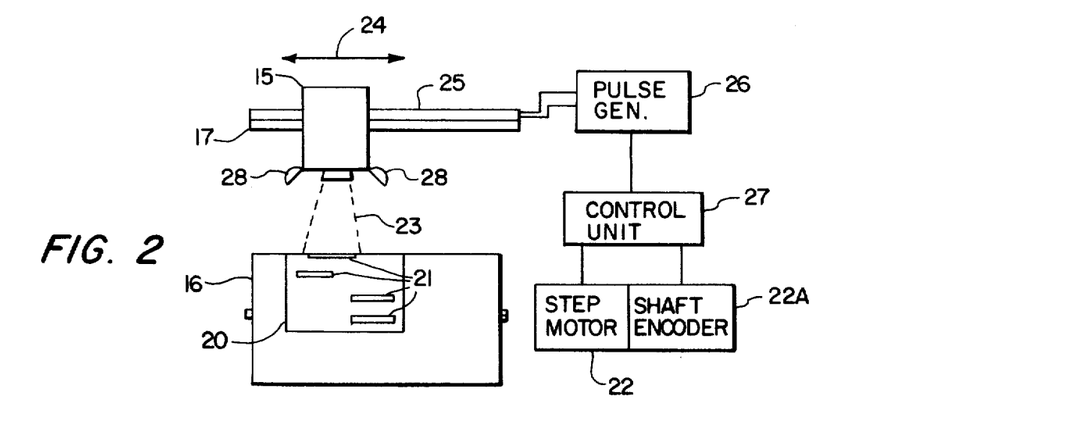
FIG. 2 is a schematic end elevation of the apparatus of FIG. 1.

As best seen in FIG. 2, drum 16 holds a record 20 on which selected data segments 21 are identified as rectangles in the figure. The drum is driven by a stepping motor 22 (such as the Model AMA 9.4 of Landis & Gyr, 6 Frankfurt am Main, Friesstr. 20-24, West Germany) so that it is rotatable, preferably in either direction, to place the desired segments within the field of view 23 of the camera 15. The camera is supported on guide rail 17 and is driven in either direction parallel with the axis of the drum, as indicated by arrow 24, by a linear induction motor 25 supplied by a pulse generator 26. Pulse generator 26 and stepping motor 22 are supplied with control signals from a control unit 27 which is provided with a control code associated with the specific format of document 20 and contains instructions for choosing and recording the selected data segments. The code can be in the form of a punched tape or magnetic card, for example, or can be a microprocessor suitably programmed by conventional techniques to supply signals to the stepping motor and pulse generator to position the drum and camera for the desired segments. As will be recognized, a feedback system can also be employed in which the drum position and the position of the camera with respect to the linear induction motor 25 are fed back to the control unit to complete the loop feedback from the drum being supplied by a shaft encoder 22a such as a Size 25, 700 Series encoder produced by Stoltz AG, Avenue Louie Casai 81, CH-1216, Geneva, Switerland. The document 20, after microfilming, if that station is employed, is moved to a stop position on the cylinder and is fixed thereto, as by suction or a simple clip on the drum. Two operational techniques are then possible. In one, the document is oriented such that the lines of data are parallel with the drum axis, in which case the cylinder is rotated through a predetermined angle corresponding to the position of the first line to be read, and the signal is given for recording. Illumination means 28 can be associated with the camera for illuminating the document during recording. A flashing light, or strobe unit, controlled with respect to time in conjunction with the other operations of the system, can be used. During recording the camera moves continuously in the axial direction of the cylinder. Thus, the control unit supplies pulses for starting and stopping the movement of the camera with respect to linear motor 25. In the other technique, the lines of data extend circularly around the drum. The camera is then moved stepwise to the location at which one end of a data segment is in its field of view and the drum is rotated to expose the remainder of the line as it passes before the camera.

In either case, rather than physical movement of the camera, effective "re-aiming" of the camera can be accomplished by changing the opening position of the lens system as with an adjustable shutter system.

After the individual data segments of document 20 are recorded, the document is removed and delivered to a receiving stack 30, and the next document is delivered to the drum.

As will be recognized, with stations A, B and C, six permutations of equipment can be chosen. If all of these units are supplied, these permutations can be made available to the operator by actuation of a selector switch.

Figure 3:
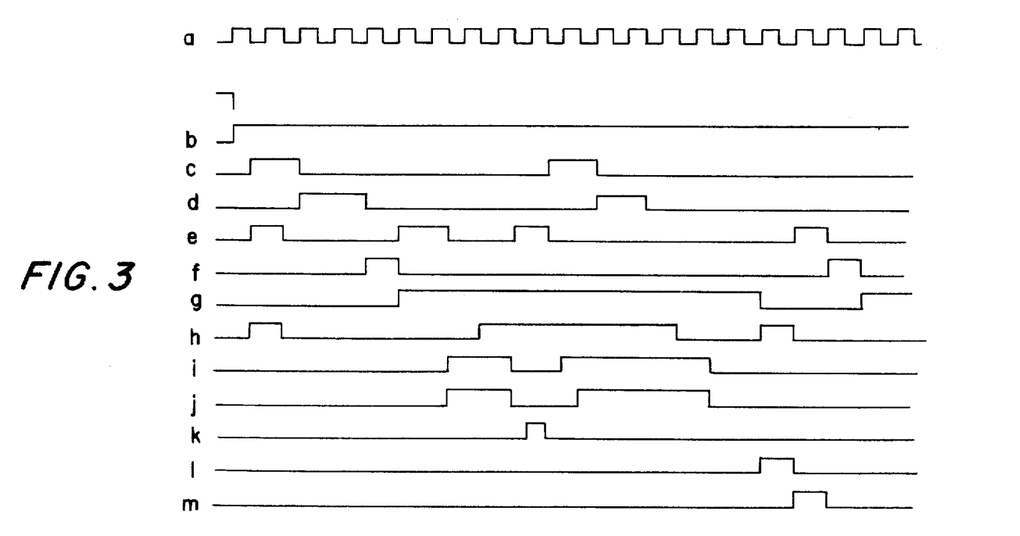
FIG. 3 is a timing diagram illustrating a sequence of operations and control signals usable in operating the apparatus of FIGS. 1 and 2.

FIG. 3 is a time chart of the processing steps in conjunction with FIG. 1. Video recording of the entire data record, being an optional feature, is not included. FIG. 3a shows a sequence of single pulses for providing a timing function. FIG. 3b is the code input with a "start" signal at the beginning of the entire operation.

FIG. 3c is the document feed signal for actuating document feeder 11, and FIG. 3d is a control pulse for operating the microfilming station A. FIG. 3e shows the pulses for positioning the cylinder in a "start" position, and FIG. 3f is a signal representing that the source document has arrived at the stop on the cylinder. FIG. 3g is a signal for actuating the mechanism holding the document to the cylinder and FIG. 3h illustrates the signal for positioning of the camera, the pulses shown therein being examples of signals for an arbitrary location of a data segment on the page. FIG. 3i shows control signals to the pulse generator bar and FIG. 3j illustrates pulses for operating the video recording of the data segment. FIG. 3k is a signal indicating the arrival of the cylinder at a completion position, and FIG. 3l is the signal for operating removal of the document from the cylinder. The signal in FIG. 3m is the control signal for removal of the document from the drum and transporting it to the output receiving hopper.

Figure 4:
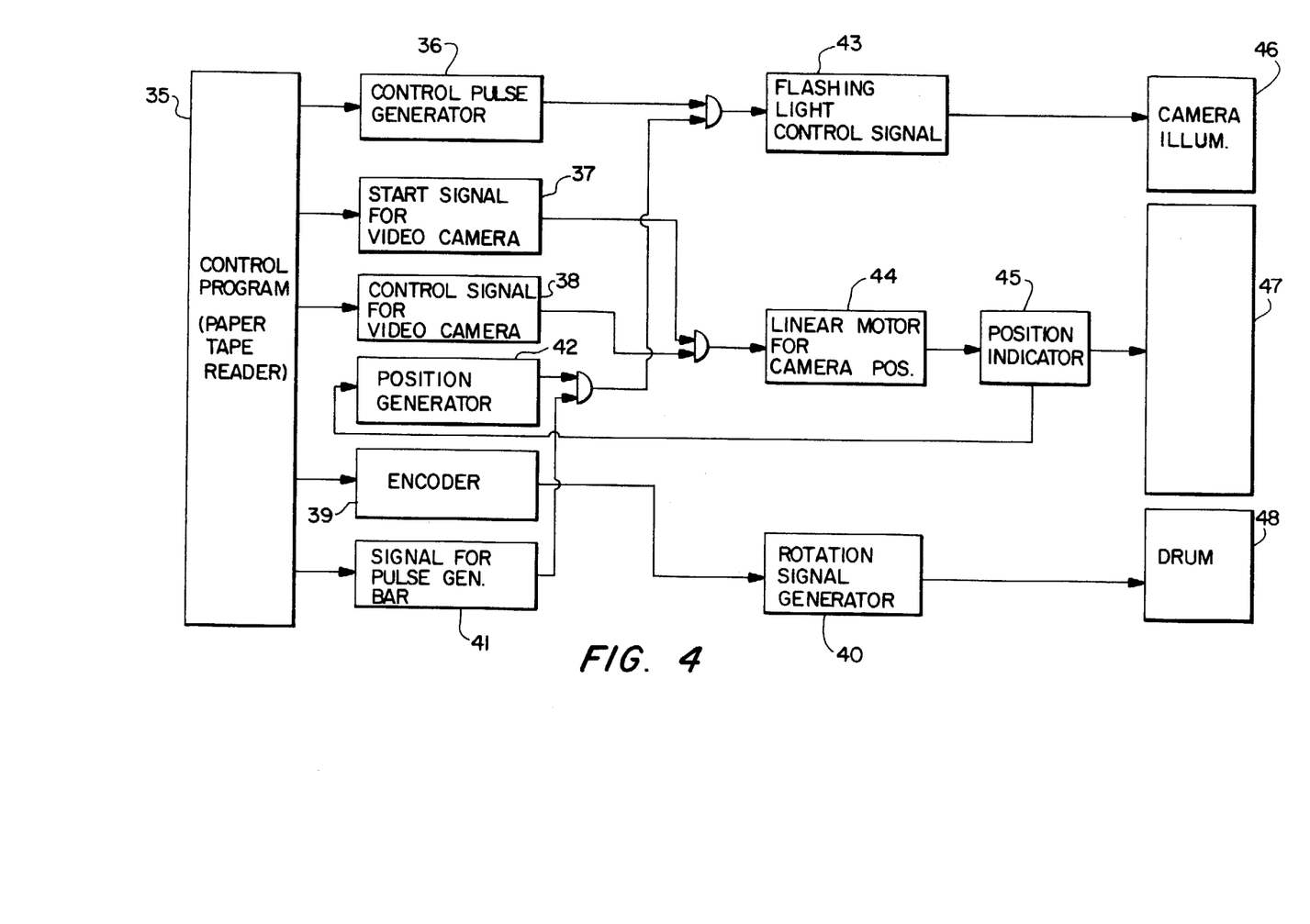
FIG. 4 is a schematic block diagram of a control system for the apparatus of FIGS. 1 and 2.

FIG. 4 is a schematic block diagram of the functions and components necessary for operating the system of FIGS. 1 and 2 in accordance with the timing diagram of FIG. 3. The function logic is a control chain having several control functions wherein the time periods and manner of operation correspond to the operating sequence shown in FIG. 2. The control chain consists generally of the elements including a control pre-set value, a control pulse generator function, a servo element, and an output.

The carrier of the control commands can be a punched tape reader such as a model GNT 27 produced by Ericsson AG, GNT Automatic Data Products Division, 8051 Zurich, Switzerland, or a Model FER 202 produced by Ghielmelti AG, 4500 Solothurn, Switzerland. As previously indicated, other program carriers are usable such as magnetic tape or card, or a microprocessor. As illustrated in FIG. 4, the paper tape reader is unit 35 which supplies signals to the various other components in the system, including a control pulse generator 36, a signal unit for supplying a start signal for the video camera, a control signal 38 for supplying a control signal for the video camera, an encoder 39 for providing signals to a rotation signal generator 40, a signal generator for providing pulses to the pulse generator bar. The document feeding device, such as a multifeed MF 233, produced by Multimatic AG, Florastrasse 19, CH-8700 Kusnacht, Zurich, Switzerland, is activated by a signal unit represented in FIG. 4 by control pulse unit 36. The pulse generators are conventional circuit elements such as multivibrators, see German AS 23 05 346.

The cylinder positioning function, FIG. 3e, is illustrated in FIG. 4 by a feedback control pulse from the incremental encoder. The functions illustrated in FIGS. 3f and 3g can be provided alternatively by the control program or by contacts on the drum, or by a photocell light barrier, i.e., an optical sensor for detecting the position and presence of the paper.

The function of FIG. 3h is initiated by the control pulse output of the control signal for video camera unit 38. The servo element is a single phase linear induction motor such as the Model 1500/1, produced by Bachofen AG, 8610 Uster, Ackerstr. 42, Switzerland.

The video pick up function, FIG. 3j, is initiated by the servo element digital flashing light or stroboscope (Reglomat AG, 9006 St. Gallen, Flurhofstr. 158, Switzerland, Model RDS 10 or RDS 25). This servo element is actuated by an AND-operation of the function shown in FIG. 3i, signal at pulse generator bar (an inductive slot sensor) and the positioner (Hettich Electronics, Postfach 81, Zurich, Switzerland, Slot Initiator SO35 A/R) which is dependent upon the signal indicating the position of the camera. The two AND gates of the control pulse cause the start of the flashing light and consequently of the video pickup only by an additional AND operation of the control pulse "pulse generator" and of the presence of a timing pulse, FIG. 3a.

Figure 5:
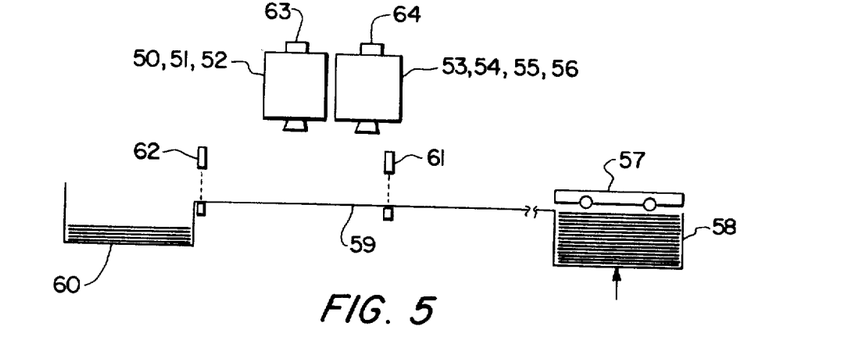
FIG. 5 is a schematic side elevation of a second embodiment of an apparatus in accordance with the invention.

As will be recognized, while the arrangement of components illustrated and discussed in connection with FIGS. 1–4 has numerous advantages and considerable flexibility, and is an economical system to construct and operate, the document feed through stations A and B can be considerably faster than the selective recording of station C because of the face that, at station C, the drum must undergo several positionings and the video camera 15 must likewise be positioned between and during exposures. An alternative embodiment which is more expensive to construct but which has the considerable advantage of greater speed and, therefore, may be desirable for some applications is illustrated in FIG. 5. As shown therein, the single video camera 15 is replaced by two banks of cameras, seven such cameras being illustrated, one group being an aligned cluster of three cameras 50, 51 and 52, and the other being a similarly aligned cluster of four cameras 53–56, in parallel relationship with the first group. In this arrangement, the first document is delivered by a document feeder 57 from a hopper 58 along a flat plate 59 and ultimately to a receiving hopper 60. The system shown in FIG. 5 includes optical sensing means or "light barriers" 61 and 62 which can be conventional photocell devices.

Cameras 50–56 are supported by support rails or brackets 63 and 64 and are essentially immovable. While they may be laterally adjustable, they are not motor driven as in the embodiment of FIG. 1 and do not move during the imaging process. It will be recognized that microfilm and full-copy video cameras can also be provided between photocell 61 and the paper feeding device 57, as in the embodiment of FIG. 1, but these are omitted from FIG. 5 for simplicity.

Figure 6:
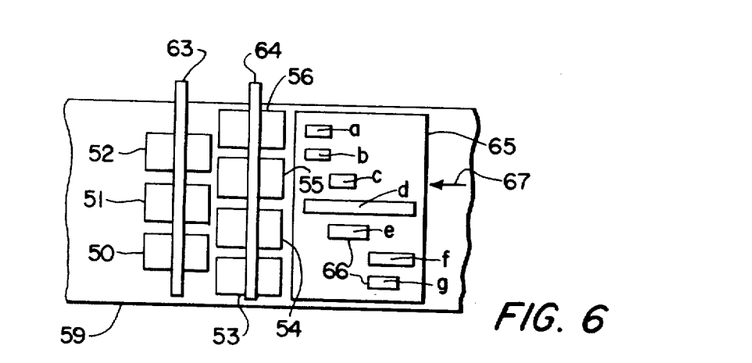
FIG. 6 is a partial top plan view of the apparatus of FIG. 5.

A schematic plan view of the arrangement of the cameras relative to a source document 65 is illustrated in FIG. 6. The various data segments on document 65 which are to be collected are indicated by rectangle 66. It will be observed that the document 66 is arranged to move sideways in the direction of arrow 67. The segments to be collected are lettered a–g for purposes of discussion. In the examples shown, segment a will pass through the field of view of camera 56, segment B will pass through the field of view of camera 52, and so forth, segment g being in the field of view of camera 53. With suitable relatively simple timing controls, the cameras, and any illumination means associated therewith, are activated a suitable time interval after the document passes the light barrier of photocell 61 so that each camera records the segment assigned to it. While each camera may record some additional data in the region around the segment to be recorded, this is of relatively little consequence.

It will also be recognized that cameras 53–56 will record data before cameras 50–52, but that the sequence of operation of the cameras does not necessarily represent the sequence in which the collected data is to be stored. The arrangement of the collected information on the ultimate recording medium can be accomplished using an apparatus such as that schematically shown in FIG. 7. As illustrated therein, a plurality of tape recording machines 68–74 is provided, each of the tape recording machines being directly associated with one of the video cameras. The recording machines can, of course, be other than tape, but tape is a particularly convenient recording technique. Each of machines 68–74 is activated along with its associated camera and records the data segment viewed by the camera. The tape is then immediately rewound, or is provided with a slack-tape storage bin so that replaying of the tape segment just recorded can be accomplished quickly. The play-back output of the recording machines is connected to a mixing device 75, the output of which is provided to a further tape or other recording device 76. Mixing device 75 is, essentially, a switching and control unit provided with a relatively simple control program, which can be paper tape or the like, which is provided with information about the sequence in which the data is to be ultimately arranged, in terms of the cameras. Thus, if it is predetermined that segment E is to be recorded first on the tape in recording device 76, unit 75 is provided with information stating that the data received by camera 54 should be supplied to mixing device 75 and tape unit 76 first. If the information from cameras 54 is supplied to tape unit 71, then the program in unit 75 simply states that the material recorded on tape unit 71 should be retrieved and conveyed to tape unit 76 first. The mixing unit then simply commands each of the other tape units 68–70 and 72–74 to "replay" its recorded data in sequence, transferring this recorded data through a suitable switch to tape unit 76. The selected data segments are thus arranged on tape 76 in a sequence which is totally independent of the arrangement of the data segments on the original source record 65.

Figure 7:
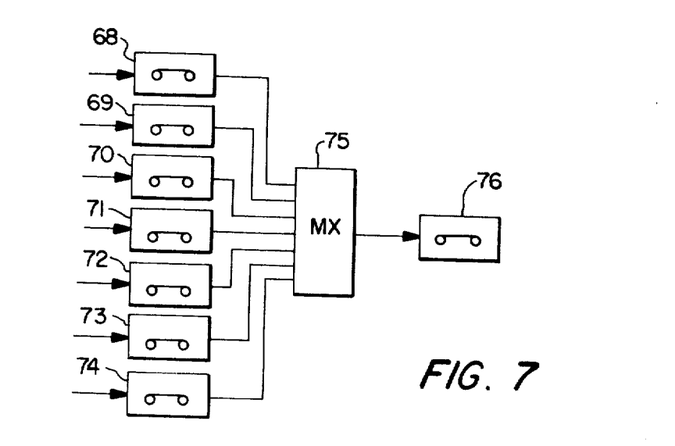
FIG. 7 is a schematic block diagram of a recording and editing apparatus usable in the system of FIGS. 5 and 6.

Summarizing the operation of the system of FIGS. 5–7, it will be seen that the source document is moved not over a cylinder, but horizontally over a flat plate. For each line of data to be recorded, a camera is installed. The cameras are not movable but are essentially mixedly installed. The combination of multiple cameras, multiple tape recorders and a switching system provides a recording and "cutting" or editing system. Since the source document can move past the cameras only one time at a given speed and slowing down, the overall system has a considerably higher capacity of document handling than in the embodiment of FIG. 1.

A light barrier creates the starting pulse for the cameras, and the pick up of the defined segments is effected substantially as in FIG. 1. The longest segment defines the minimum transit time of each document.

The second light barrier, of photocell 62, controls the feed of the next succeeding document. Since the editing or cutting is accomplished during the recording time of the subsequent document, the only supplemental time expended occurs during the first cycle.

In this system, a suitable video camera is the Sony Model AVC 3250 CES/AVC 3250 CEK, or a Sony DXC-1200P. A recording and editing system suitable for use in this system is the Sony 2860P/RM 430CE.

A dropout compensator, which is a digital time base corrector usable in conjunction with the editing system is the Sony 3VT-3000P.

Figure 8:
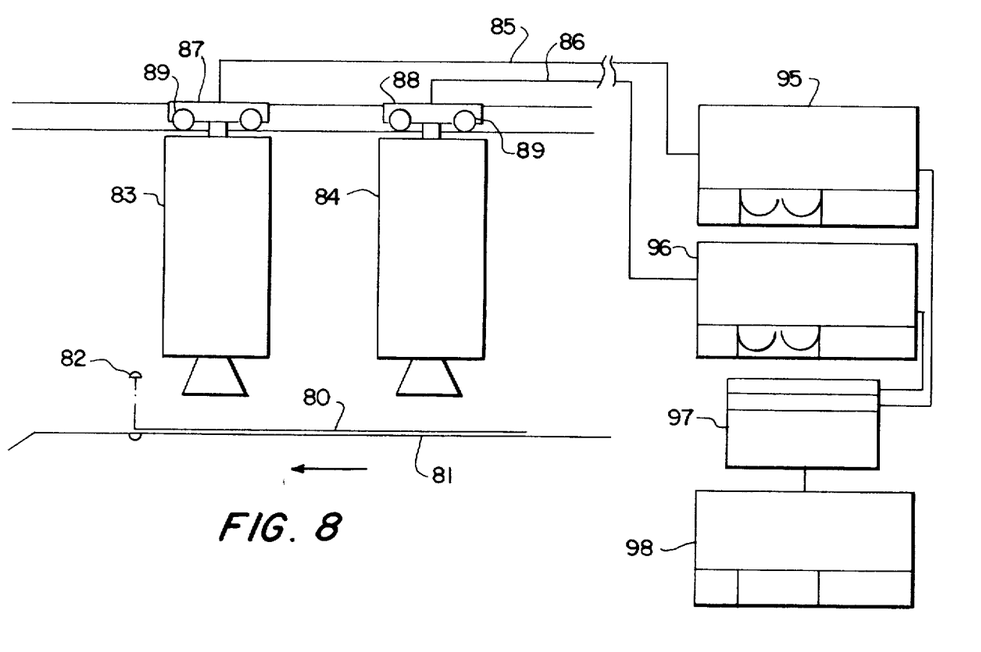
FIG. 8 is a schematic side elevation of a third embodiment of an apparatus in accordance with the invention.
Figure 9:
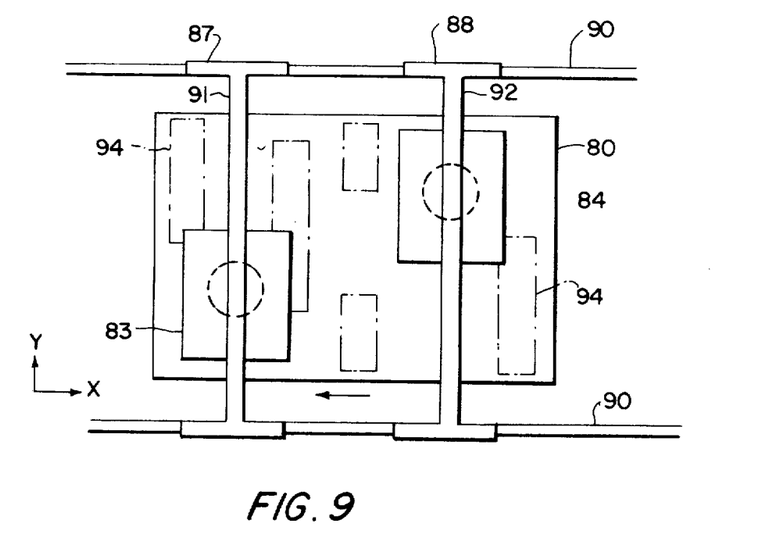
FIG. 9 is a partial top plan view of the apparatus of FIG. 8.

A further embodiment of an apparatus in accordance with the invention is shown in FIGS. 8 and 9. As will be recognized, this embodiment has numerous similarities with the embodiments of FIG. 1 and FIGS. 5–7, but there are also significant differences. As illustrated in FIGS. 5 and 6, the source document is moved over a flat plate rather than on a cylinder although a cylinder apparatus can alternatively be used. As seen in FIGS. 8 and 9, the document 80 is conveyed across a flat plate 81 by a document feeder similar to that shown in FIGS. 1 and 5, and the arrival of the document at a starting point for recording the data segments is detected by a photocell light barrier 82. Two cameras 83 and 84 are used, the cameras being electrically connected on conductors 85 and 86, respectively, to recording apparatus. The cameras are supported on movable carriages 87 and 88 which have wheels 89 riding on parallel spaced-apart tracks 90.

Carriages 87 and 88 are provided with crossbars 91 and 92, respectively, which perform a function similar to the support bar and linear induction motor 17 and 25 illustrated in FIGS. 1 and 2, the cameras thus being supported so that they are movable longitudinally with respect to the crossbars and laterally with respect to the direction of conveyance of the source document 80. Thus, each camera is movable in both the X and Y directions with respect to the document, i.e., longitudinally by carriages 87 rolling on wheels 89, and transversely on crossbars 91 and 92.

As illustrated schematically in FIG. 9, the source document is placed under the cameras in a lengthwise direction, i.e., such that the data segments extend in the Y direction. These data segments are indicated by the rectangle 94 in FIG. 9.

In operation, when the arrival of the document at the location for the beginning of data segment collection is signalled by the photocell light barrier 82, the cameras begin a sequence of transverse and longitudinal movement, and are activated as they pass over those data segments which are to be collected. Because of this relatively rapid movement and the use of two cameras, the data collection process is somewhat faster than that in the embodiment of FIGS. 1 and 2. Alternatively, the source record can be arranged with the data segments extending in the X direction in which case the camera movement will be adjusted accordingly.

A recording and editing system is used in this embodiment, this system being similar to, but somewhat simpler than, the system discussed in connection with FIGS. 5–7. Each of cameras 83 and 84 is associated with a tape recording machine, camera 83 being coupled to a recorder 95 and camera 84 being connected to a recorder 96. As will be recognized, each of recording machines 95 and 96 receives more than one data segment. After the data segments have been recorded, a mixing control device 97, which is similar to unit 75 of FIG. 7, chooses those segments and controls the playback sequence of units 95 and 96 so that the selected data segments can be recorded in the desired sequence on a final tape in a recording device 98. While the control program for unit 97 is slightly more complex than that required for unit 75, it is simply a sequence of rewind, playback, start and stop signals arranged in accordance with the desired ultimate recording arrangement.

It will also be recognized that the cameras can be moved on carriages 87 and 88 such that the prerecording on units 95 and 96 is accomplished in a desired initial sequence, thus simplifying the control program in unit 97. This avoids the problem of having a series of segments on tape 95 in which a later segment must be transmitted to unit 98 before an earlier segment recorded thereon. As will be recognized, the source document is held stationary during the data collection sequence.

PHASE II-DATA COLLECTION AND DISPLAY

The foregoing discussion has been devoted to the phase I data collection method and apparatus in which selected data segments from the source data records have been stored in a desired sequence. After all of the desired data segments have been collected and stored from the source documents, for example, on videotape, the tape cartridge or reel is ready for phase II data collection.

The system employing phase I data collection supports the trend toward a centralized documentation and filing system of any company's operation, reduces the flood of paper substantially and increases more than ever the value of the data because it is more logically and easily retrievable.

Figure 12:
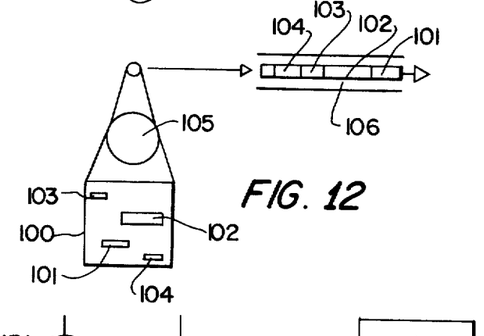
FIG. 12 is a symbolic schematic representation of the principal of the systems of FIGS. 1, 2, 5, 6, 8 and 9.

The process of storing the data, as previously described, can be schematically summarized in the manner shown in FIG. 12 in a rather generalized form wherein a source record 100 with data segments 101, 102, 103 and 104 are collected by camera means 105 on a storage medium 106 in the desired sequence, the arrow indicating the direction of normal motion of the record medium.

FIG. 12 schematically shows, in rather symbolic form, a system incorporating the principals of the Phas I precollection common to the embodiments previously described. A source document 100 having data thereon of which data segments 101, 102, 103 and 104 are to be collected, is placed in the field of view of an analog-to-analog optical recording device 105 such as a video camera. The selected data segments are collected and temporarily or permanently stored on a record 106 in the desired sequence.

Figure 10:
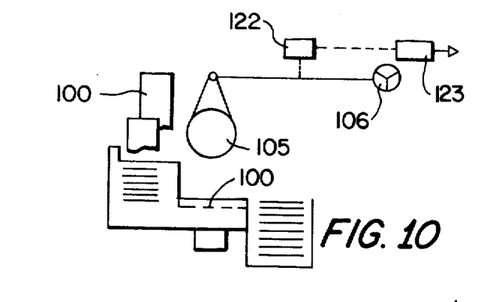
FIG. 10 is a symbolic schematic illustration of a system in accordance with the invention used with alternative processing equipment.
Figure 11:
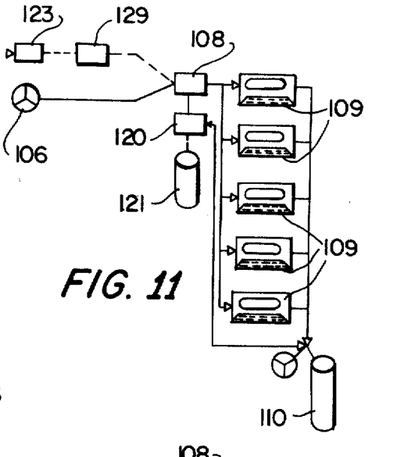
FIG. 11 is a symbolic schematic diagram of digital processing apparatus utilizing data precollected by the method and apparatus of the present invention.

Considering FIGS. 10 and 11 together, in which similar symbols and reference numerals are used, further processing and preparation of the stored data is shown. The data segments on the intermediate storage 106 are displayed at a reading station 108 which can be supplied with a refresh memory or temporary buffer storage, for increased throughput, or by optical collection and transmission via one or more television or video cameras with refresh memory or disk for direct access, to be distributed and displayed to a plurality of input stations 109 which can be regarded as keypunch stations or the equivalent for putting the data in digital form, either in its entirety or selected portions thereof. The information in digital format is supplied to a memory 110 which constitutes a data file storage. Additional inputs to the reading station can be employed from a memory 121 through a buffer 120. The use of this method for key processing, using intermediate storage media, renders the data collection and preparation independent of the location of the original records and also independent in time.

Instead of further processing by means of the intermediate storage 106 the data precollected by the Video Camera 105 may be moved to a storage (buffer) 123 via an analog/digital transducer 122 which is also shown in FIG. 10. Coming out of storage 123 the data segments can be processed independently of original records, time, and (to quite an extent) place. The transduction of the data segments takes place via a digital/analog transducer; or, the analog values, without any transduction, are read in directly (for instance by video scan, or OCR data, also known as source data capture).

Figure 13:
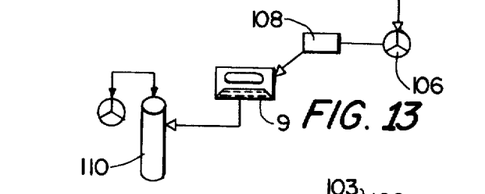
FIG. 13 is a symbolic schematic diagram of a digital system employing data precollected in accordance with the invention.

A single work station is shown in FIG. 13 where a segment distribution device 108 controls the distribution of the previously arranged data segments to input display stations 109, so that operators can view the data segments on the input stations 109 for coding and transmission to the storage device 110.

Figure 14:
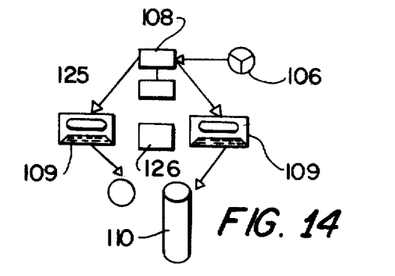
FIG. 14 is a symbolic schematic diagram of an alternative digital system using data precollected in accordance with the invention.

In FIG. 14 double input stations are shown for working in a parallel mode which permits immediate and substantially concurrent display of the identical data segment(s), for keying and automatic verification of the key-processed information. The intermediate storage medium 106 and the segment distribution device 108 are of the same type as the equipment for a single input station. A computer 125 provides for the proper distribution of data segments to the input stations 109. From the input stations 109 key-processing of the data and storing of same into the storage medium 110 takes place. A storage supported by a computer program comparing on even for verification purposes 126 permits the immediate detection of errors for immediate correction. In case of erroneous input, the storage for verification purposes displays the error(s) via the screen (in digital format) so that an appropriate correction can be made.

The described sequence by which data segments of a record can be key-processed also permits another added simple means of record information security by the transmission of sequenced individual data segments to different input stations for key-processing. For instance, the "name" data segment can be sent to a keypunch input station X, "account number" to input station Y, and "amount" to input station Z. The proper sequence of the data is controlled when storing the key-processed data in the storage medium.

Figure 15:
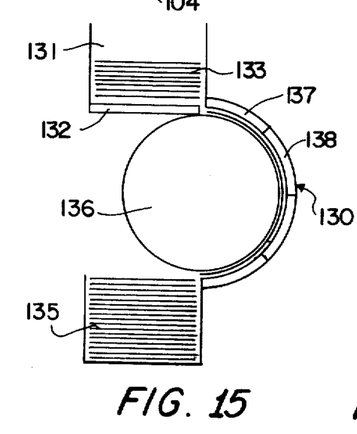
FIGS. 15-17 are simplified schematic illustrations of alternative data precollection devices usable in conjunction with the embodiments of FIGS. 1, 2, 5, 6, 8 and 9, FIG. 15 being a side elevation of one embodiment and FIGS. 16 and 17 being front and side elevations, respectively, of a further embodiment.
Figures 16, 17:
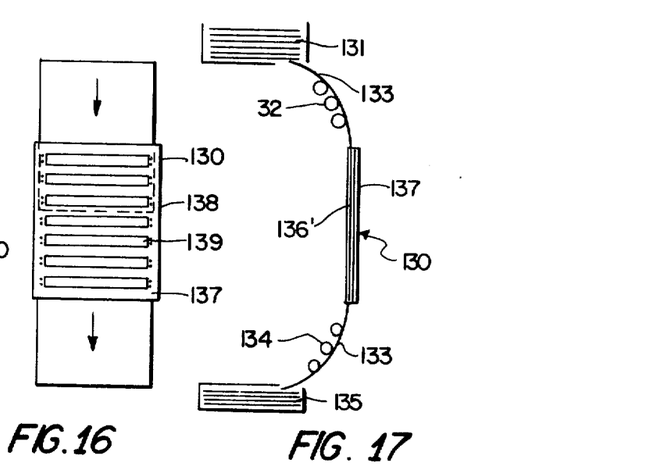

FIGS. 15, 16 and 17 illustrate schematically two additional types of Phase I reader stations C (FIGS. 1, 2, 5, 6, 8 and 9). Above the reader station 130 a record hopper 131 is located which is for records which are all of the same type. Each record 133 is fed via a feed device 132 over the reader station 130. The reader station can be in the form of either a cylinder or plate. After processing, the record 133 is transported to a stacker 135 via a feed which, as in the case of feed 132, may include a series of cylinder transports.

In FIG. 15 180° or 360° of the cylinder 136 corresponds to the length of a given record. The record is moved under the plate 137 and rests on the cylinder 136. Selected ones of the segments 138 of the plate 137 can provide an opening 139 as desired. The record 133 is moved by control under the opening 139 by means of a turning motion of the cylinder, thus displaying the desired data segment. In case of data segments to be collected (lengthwise) which are larger than is provided for by the opening 139, the equipment will set a mark at the end of the partsegment which has up to then been displayed. Thereupon, in one or several further steps by horizontal movement of the cylinder or of the segment opening which is carried by the plate under which the record is positioned, the remainder of the data segments is displayed.

There also exists the possibility to provide the plate 137 with uniform type openings and to display the desired segments. The records may also be fed through the vertically located reader plate 130, electronically (microprocessor) or tape-controlled, whereby the individual data segments are displayed in the desired sequence.

What is claimed is:

1. A metod of precollecting and organizing selected segments of data from a plurality of source records comprising the steps of
   providing a plurality of source records, each having a plurality of human-readable, analog data segments thereon in a known format;
   identifying selected ones of the human readable data segments which are to be collected;
   defining a sequence in which the identified segments are to be collected and arranged, which sequence is different from and independent of the format in which they appear on the source record;
   providing at least one recording apparatus capable of recording an optical representation of a visible image placed within its field of view;
   successively positioning each source document and the apparatus relative to each other such that portions thereof are within the field of view; and
   successively recording optical representations of the identified data segments in analog form in the defined sequence on a record from which analog representations of the identified segments can be reproduced.

2. A method according to claim 1 and further including the step of
   forming a digital representation of each data segment and storing the representations thus formed concurrently with the step of recording the optical representation and in the same defined sequence.

3. A method according to claim 2 wherein a plurality of recording apparatus are provided, and wherein the step of successively recording includes concurrent recording of plural segments.

4. A method according to claim 3, wherein the optical representations are recorded on a video recording medium and further comprising the step of sequentially displaying the data segments precollected in analog format on a video screen to an operator for manual conversion to digital form for storage.

5. A method according to claim 3 and further comprising the step of sequentially displaying the same data segments precollected in analog format concurrently to at least two key operators for substantially concurrent conversion into digital form for storage.

6. A method according to claim 1 wherein a plurality of recording apparatus are provided, and wherein the step of successively recording includes concurrent recording of plural segments.

7. A method according to claim 1, wherein the optical representations are recorded on a viedo recording medium and further comprising the step of sequentially displaying the data segments precollected in analog format on a video screen to an operator for manual conversion to digital form for storage.

8. A method according to claim 1 and further comprising the step of sequentially displaying the same data seqments precollected in analog format concurrently to at least two key operators for substantially concurrent conversion into digital form for storage.

9. A method according to claim 1 wherein the recording apparatus is photographic and the record medium is photographic film.

10. A method according to claim 9 and further comprising the steps of subsequently displaying the recorded data segments and manually converting the information contained therein to digital form for storage.

11. An apparatus for precollecting and organizing selected segments of data from each of a plurality of source records, each of the records being of the type having a plurality of human readable data segments thereon in a known format, comprising the combination of
    means for sequentially delivering individual ones of said source records to a recording station;
    camera means at said recording station having
        optical means for forming an image of a portion of a source record in the field of view thereof, and
        record forming means for storing an analog record of the portion of a source record in the field of view when actuated;
    means for providing relative movement between said source record and said camera means so that predetermined areas of said source record are brought into said field of view; and
    control means for repeatedly actuating said camera means during said relative movement so that selected data segments in said selected areas are recorded in a desired sequence independent of the original format of said source records.

12. An apparatus according to claim 11 wherein said means for providing relative movement includes a rotatable drum for receiving and carrying said source record.

13. An apparatus according to claim 11 wherein said camera means includes a plurality of devices each having optical means for forming an image of a portion of a source record.

14. An apparatus according to claim 13 wherein said means for providing relative movement includes means for moving each of said devices independently of each other and relative to a source document,
    and wherein said control means actuates each of said devices separately.

15. An apparatus according to claim 13 wherein said devices included in said camera means are fixed and said means for providing relative movement moves said source document.

16. An apparatus according to claim 11 wherein said record means includes a video recording medium.

17. An apparatus according to claim 11 wherein said record means includes a photographic recording medium.

* * * * *